United States Patent [19]

Denoncourt et al.

[11] Patent Number: 5,593,563
[45] Date of Patent: Jan. 14, 1997

[54] ELECTRODEIONIZATION PROCESS FOR PURIFYING A LIQUID

[75] Inventors: Jeffrey P. Denoncourt, Winchester, Mass.; Jacques Moulin, Plaisir, France

[73] Assignee: Millipore Corporation, Bedford, Mass.

[21] Appl. No.: 638,040

[22] Filed: Apr. 26, 1996

[51] Int. Cl.⁶ .......................... C02F 1/469; B01D 61/48
[52] U.S. Cl. .................. 204/524; 204/525; 204/533; 204/536; 205/748; 205/753
[58] Field of Search ..................... 205/748, 753; 204/524, 525, 533, 536

[56] References Cited

U.S. PATENT DOCUMENTS 5,308,466   5/1994   Ganzi et al. ........................ 204/524

*Primary Examiner*—Arun S. Phasge
*Attorney, Agent, or Firm*—Andrew T. Karnakis; Paul J. Cook

[57] ABSTRACT

In an electrodeionization apparatus having a cathode compartment and an anode compartment for removing ions from a liquid under the influence of a voltage, the cathode compartment includes electron conductive particles such as metal particles and/or carbon particles.

10 Claims, 7 Drawing Sheets

ELECTRODEIONIZATION PROCESS FOR PURIFYING A LIQUID

BACKGROUND OF THE INVENTION

This invention relates to a novel electrodeionization module adapted to transfer ions in a liquid under the influence of a polar field, More specifically, this inventions relates to an electrodeionization apparatus adapted to purify aqueous liquids to effect the production of high purity water and to minimize scale formation.

The purification of a liquid by reducing the concentration of ions or molecules in the liquid has been an area of substantial technological interest. Many techniques have been used to purify and isolate liquids or to obtain concentrated pools of specific ions or molecules from a liquid mixture. The most well-known processes include distillation, electrodialysis, reverse osmosis, liquid chromatography, membrane filtration and ion exchange. A lesser known method is electrodeionization, occasionally mistermed filled cell electrodialysis.

The first apparatus and method for treating liquids by electrodeionization was described by Kollsman in U.S. Pat. Nos. 2,689,826 and 2,815,320. The first of these patents describes an apparatus and process for the removal of ions within a liquid mixture in a depleting chamber through a series of anionic and cationic membranes into a second volume of liquid in a concentrating chamber under the influence of an electrical potential which causes the preselected ions to travel in a predetermined direction. The volume of the liquid being treated is depleted of ions while the volume of the second liquid becomes enriched with the transfer ions and carries them in concentrated form. The second of these patents describes the use of macroporous beads formed of ion exchange resins as a filler material positioned between the anionic or cationic membranes. This ion exchange resin acts as a path for ion transfer and also serves as an increased conductivity bridge between the membrane for the movement of ions.

The term "electrodeionization" refers to the process wherein an ion exchange material is positioned between anion and cationic membranes. The term "electrodialysis" refers to such a process which does not utilize ion exchange resins between the anionic and cationic membranes. Illustrative of other prior art attempts to use the combination of electrodialysis and ion exchange materials or resins to purify saline from brackish water are described in U.S. Pat. Nos. 2,794,770; 2,796,395; 2,947,688; 3,384,568; 2,923,674; 3,014,855 and 4,165,273. Attempts to improve electrodeionization apparatus are shown in U.S. Pat. Nos. 3,149,061; 3,291,713; 3,515,664; 3,562,139; 3,993,517 and 4,284,492.

In any membrane separation process where ions become concentrated there is the potential to exceed solubility limits and form scale. In particular, calcium carbonate scale, $CaCO_3$, is formed when the levels of $Ca^{2+}$ and $CO_3^{2-}$ in water reach a solubility limit.

Furthermore, the level of $CO_3^{2-}$ in water is function of the pH of the water and the equilibrium with bicarbonate, $HCO_3^-$.

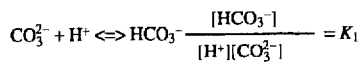

By combining the equations above, the scale potential relative to calcium and bicarbonate concentrations and the pH of the water is defined.

$$\frac{[Ca^{2+}][HCO_3^-]}{[H^+]} = K_{sp} \cdot K_1 \qquad (3)$$

The potential for forming scale increases with an increase in calcium ion concentration, an increase in bicarbonate ion concentration or an increase in pH. In addition, the ion concentration increases when the electrodeionization module is operated to recover an increased percentage of incoming water as purified water.

Reactions at the electrodeionization electrodes and water splitting in the electrodeionization process can create significant shifts in the pH of the waste water stream. The reactions occurring at the electrodes are shown below. The generation of $OH^-$ at the cathode creates an area of high scale potential.

| Anode Reaction | Cathode Reaction |
|---|---|
| (4) $2H_2O \gg 4H^+ + 4e^- + O_2$ $2Cl^- \gg 2e^- + Cl_2$ | (5) $2H_2O + 2e^- \gg 2OH^- + H_2$ |

Water splitting within the diluting compartments is an additional source of $OH^-$ within the electrodeionization module. In the concentrating compartment where $OH^-$ is entering through the anion membrane and especially along the surface of that anion membrane is were pH can become high resulting in areas with high risk of scale formation. Since pH is the negative log of the $H^+$ concentration, what appears to be a small change in pH will have a significant impact to scale potential. For example an increase in one pH unit will increase the scale potential by a factor of 10.

Formation of scale within the electrodeionization module will result in a very high electrical resistance and blocked flow channels leading to a quick decline in water quality produced. Several methods or combination of methods presently are used to reduce the risk of scale in an electrodeionization module. In a first method water is pretreated before it enters an electrodeionization module to reduce the levels of $Ca^{2+}$ and/or $HCO_3^-$ or to decrease pH thereby reducing the potential to form scale. For example, a properly functioning ion exchange softener will reduce $Ca^{2+}$ levels by exchanging $2Na^+$ for the $Ca^{2+}$ in the feed water. The solubility of $Na_2CO_3$ is very high with almost no risk of scale formation. The softener is regenerated by treating the resin with high concentrations of NaCl. Although a very effective method to reduce scale potential, softening has had limited success with the electrodeionization product. Improper maintenance, increases in feed water $Ca^{2+}$ levels, and/or increases in the volume of water treated results in high leakage of $Ca^{2+}$ and subsequent scaling of the electrodeionization module. In addition, the added cost and the size of a softener resin tank and salt regeneration tank are not desirable and especially does not fit with the concept of the compact, reliable and easy to use approach desired for a smaller laboratory water system.

In a second pretreatment process, reverse osmosis (RO) is used to remove greater than 90 to 95% of the $Ca^{2+}$ and $HCO_3^-$ in the feed water thereby significantly reducing the potential to form scale. However, in locations where the $Ca^{2+}$ and $HCO_3^-$ levels are very high, (over 100 ppm of $Ca^{+2}$ feeding the RO), enough $Ca^{+2}$ and $HCO_3^-$ pass the RO so that an electrodeionization module can still suffer from scale formation. In these locations the current technology is forced to use softening to pretreat the RO prior to electrodeionization.

A commercially successful electrodeionization apparatus and process is described in U.S. Pat. No. 4,632,745. The apparatus utilizes ion depleting compartments containing an ion exchange solid composition and a concentrating compartment which is free of ion exchange solid material. The electrodeionization apparatus includes two terminal electrode chambers containing an anode and a cathode respectively which are utilized to pass direct current transversely through the body of the apparatus containing a plurality of ion depleting compartments and ion concentrating compartments. In operation, the dissolved ionized salts of the liquid are transferred through the appropriate membrane from the ion depleting compartments to the ion concentrating compartments. The ions collected in the ion concentrating compartments are removed through discharge outlets and are directed to waste. The deposit of insoluble scale within the cathode compartment has been a problem associated with this process.

It has been proposed in U.S. Pat. No. 3,341,441, in an electrodialysis process, to reverse periodically the direction of current flow in which case, the electrode once serving as the cathode becomes the anode while the anode chamber becomes the cathode. The solution flowing through the anode chamber becomes acidic due to anodic electrolytic action, and the acid thus formed tends to dissolve a small portion of scale formed therein during the time the electrode was cathodic. In the process the flow is reduced or stopped and thus, the acid generated within the anode chamber is allowed to attain a sufficiently high concentration in the chamber so as to dissolve precipitated scale formed therein during the electrode's previous cathodic cycle and thereafter, reversing the polarity of the direct current is performed at periodic intervals. In a preferred form of the process, a third step is also employed comprising continuously flushing the cathode compartment with a sufficiently large volume of electrolyte solution to quickly remove any base generated therein. When the direct current is reversed, the ion depleting compartments become the ion concentrating compartments and the ion concentrating compartments become the ion depleting compartments. This process can be undesirable since a large volume of liquid being purified must be discharged to waste in a time interval immediately following voltage polarity reversal since the concentration of electrolyte in the newly formed ion depleting compartments is too high for a period of time to render the purity of the liquid product acceptable.

It has also been proposed in U.S. Pat. No. 4,956,071 to utilize voltage polarity reversal in an electrodeionization process in order to reduce scale formation. In the process, the voltage through the process is periodically reversed, typically every 15 to 20 minutes, with the voltage polarity in a given direction being approximately 50% of the time of process operation. With each voltage polarity reversal, the dilution compartments become concentration compartments and the concentration compartments become dilution compartments. As a result of the voltage polarity reversal, several valves are needed in the system for distributing the streams. Two valves typically are needed to direct the appropriate dilute stream to the final point of use. In addition, control means for these valves may be required to direct water to drain until acceptable purity levels are reached. In addition, one or two additional valves typically are used to control flow rates to electrode streams in order to optimize pH shifts and scale prevention. This patent discloses that an electrode spacer having an ion permeable membrane and positioned adjacent to anode and cathode optionally can be filled with ion exchange resin.

Additional electrodeionization apparatus are disclosed by U.S. Pat. Nos. 5,154,809; 5,308,466 and 5,316,637. U.S. Pat. No. 5,308,466 discloses, an electrodeionization apparatus utilizing concentration compartments containing ion exchange resin. The advantage provided by ion exchange resins in the concentrating compartments is improved performance and, specifically for improved removal or separation of highly charged, large highly hydrated, or weakly ionized species, silica, sulfate, calcium, heavy metals, and polar and ionized organics. The patent does not discuss the effect on scale formation as a result of utilizing resins in the concentrating compartments.

U.S. Pat. No. 4,226,688 discloses an electrodialysis apparatus including a cathode compartment and an anode compartment. A conductive slurry of carbon particles is continuously transferred between the electrode compartments at a rate of at least 1 ml/min/per cm$^2$ of electrode area. Hydrogen produced at the cathode compartment is absorbed by the carbon particles and released at the anode compartment. Scale production and corrosion problems are reduced by this process. The process is undesirably complex in that it requires pumping, conduits and control apparatus.

Accordingly, it would be desirable to provide an electrodeionization process which minimizes or prevents scale formation. In addition, it would be desirable to provide such a process which does not require a complex piping, valving, pumping and control system for directing a newly produced dilute stream to a point of final use or to transfer scale reducing compositions between electrode components.

SUMMARY OF THE INVENTION

The present invention is based upon the discovery that the inclusion of electrically conductive particles such as beads, granules or fibers in the cathode compartment significantly reduces scale formation when operating an device electrodeionization having anode and cathode compartments. The reduction in scaling in the cathode compartment results from the formation of lower local concentrations of hydroxide ion in the cathode compartment which is affected by electron transfer from the cathode to a large surface area of electrically conductive particles in the cathode compartment. The large surface area of electrically conductive particles reduces the local concentration of the formed hydroxide by increasing the surface area over which the hydroxide is concentrated. This ensures that high local hydroxide concentrations do not occur. The significantly reduced potential for scale formation is attained without the need for additional mechanical, control or storage apparatus.

DESCRIPTION OF SPECIFIC EMBODIMENTS

Figure 1:
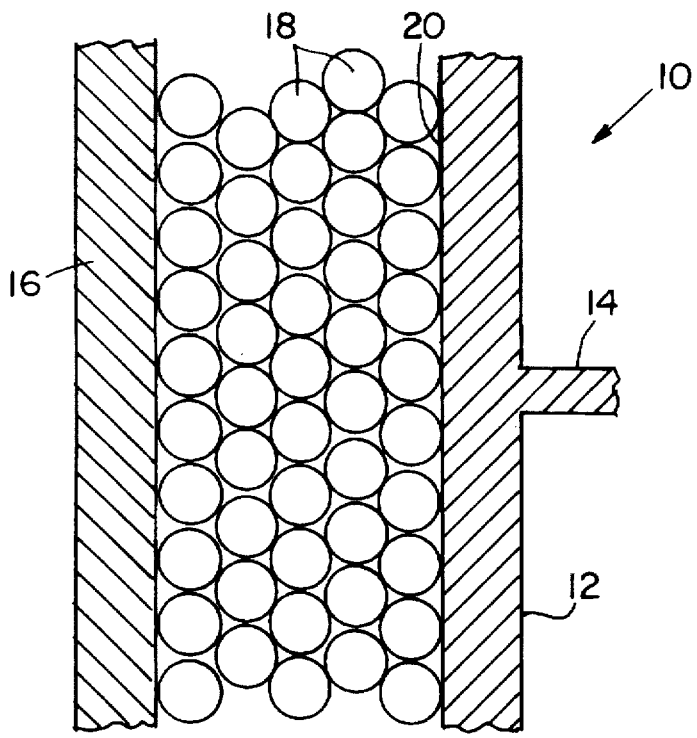
FIG. 1 is a partial cross-sectional view of the filled cathode compartment of this invention.

In accordance with this invention, an electrodeionization apparatus and process are provided which utilize a cathode compartment filled with high surface area particles which conduct electrons such as carbon and/or metal beads, granules, or fibers or the like. The electrodeionization apparatus, can comprise one or a plurality of stages. Each stage comprises, an anode compartment positioned at an end of a stack of depleting and concentrating compartments opposite from an end at which the filled cathode compartment is positioned. The anode and cathode includes an electrode spacer for passage of electrolyte and an ion permeable membrane. Only the spacer of the cathode compartment needs be filled with the electron conductive particles. However, if desired, the anode compartment also can be filled with the electron conductive particles. The remaining portion of each stage comprises a series of alternating depleting and concentration compartments. The depleting compartments contain ion exchange resin. The liquid to be depleted of ions can be passed in series, parallel or a combination of series and parallel through each depleting compartment in each stage while a second electrolyte liquid is passed through each concentrating compartment in each stage in order to effect transfer of ions from the first liquid in the depleting compartment to the second electrolyte liquid in the concentrating compartments. The concentrating compartment may also contain ion exchange resin. When a plurality of stages are utilized, the liquid removed from depleting compartments in an upstream stage can be directed in series into the depleting compartments of the next adjacent downstream stage. Similarly, the liquid removed from the concentrating compartments of an upstream stage can be directed in series to the concentrating compartments in the next adjacent downstream stage. These individual streams also can be split into multiple streams to feed a number of compartments in a parallel flow configuration. Electrolyte can be obtained from the feed product, neutral, or concentrate streams or from an independent source and passed through a spacer adjacent to each electrode in the electrodeionization apparatus and is removed from the electrodeionization apparatus. A neutral zone is a zone where little or no ion concentration or ion depletion occurs. Optionally, electrolyte from the spacer adjacent to the electrode can be passed through one or more neutral zones or to the concentrate stream prior to being directed to waste. In accordance with this invention, scale build up within the cathode is prevented by including therein materials which conduct electrons. Materials which conduct electrons provide improved control of or prevention of scale in the cathode as compared with particles which conduct ion species such as ion exchange resin particles. However, the materials utilized to conduct electrons also can contain a small amount, i.e. less than about 10 weight percent of particles which conduct ion species based upon the total weight of particles without significantly reducing the effectiveness of the electron-conducting particles. The electrically conductive particles significantly increase the total effective surface area of the cathode. As a result, the electrode reaction and therefore the hydroxide ion produced is distributed over a significantly larger area so that the local hydroxide ion concentration and therefore the local pH is significantly reduced to a level wherein scale formation is minimized or prevented.

The electron conducting particles comprising carbon and/or metal particles can be formed in any convenient configuration which provides a high surface area of the particles. Thus, the particles can be beads, granules, fibers or the like. In addition, the particles can be unsupported or supported on a matrix such a woven or nonwoven fibers such as polymeric fibers which are positioned within the liquid in the cathode compartment.

Referring to FIG. 1, a cathode compartment of this invention 10 which is utilized with an otherwise conventional electrodeionization apparatus is shown. The cathode compartment 10 includes a cathode plate member 12, a connection 14 to be connected to a source of DC voltage, an ion permeable membrane 16 and electrically conductive material 18. The electrically conductive material 18 provides a substantially increased effective cathode surface area as compared to the area of the surface 20 of cathode plate 12. As a result of the increased surface area, the local hydroxide concentration at the cathode surface is substantially reduced.

FIGS. 2–6 provide representative process flow arrangements for balancing pH, ion concentration and liquid flow to minimize extreme process conditions and to limit the possibility of scale formation.

Figure 2:
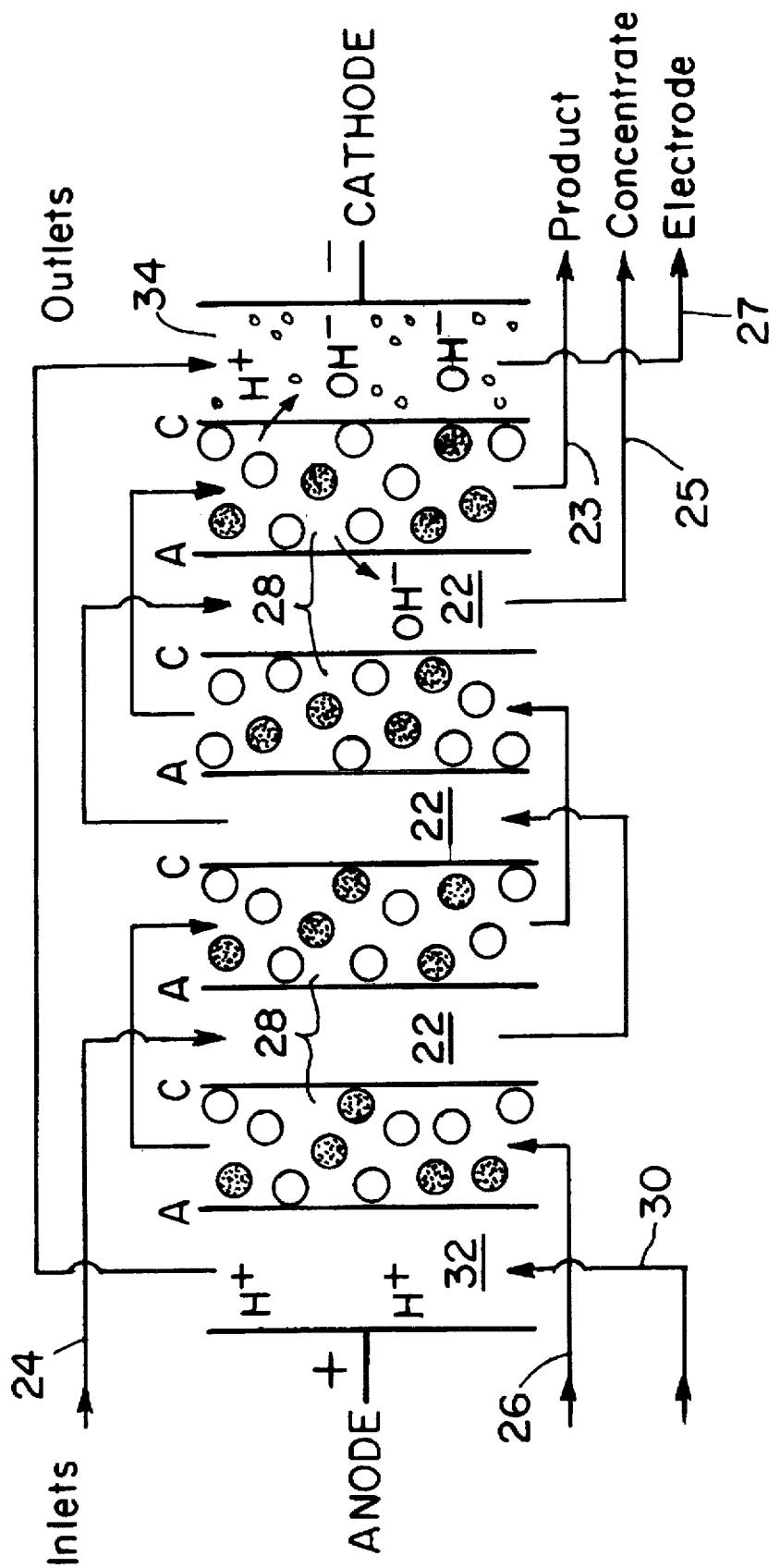
FIG. 2 is a schematic diagram of an electrodeionization process utilizing the apparatus of this invention.

Referring to FIG. 2, a liquid flow path pattern is shown wherein concentrated electrolyte liquid 24 is passed in series through ion concentrating compartment 22 while liquid to be purified 26 is passed in series through ion depleting compartments 28. The ion depleting compartments 28 contain a mixture of anion and cation exchange resin beads. The ion concentrating compartment may also contain a mixture of anion and cation exchange resin. The ion concentrating compartments 22 and the ion depleting compartments 28 are bounded by anion permeable membranes, A, and cation permeable membranes, C. A third electrolyte liquid stream 30 is passed in series through anode compartments 32 and cathode compartment 34 containing electrically conductive material. Purified product 23 is recovered while concentrate 25 and electrode liquid 27 are sent to waste or recycled to their respective inlets.

Figure 3:
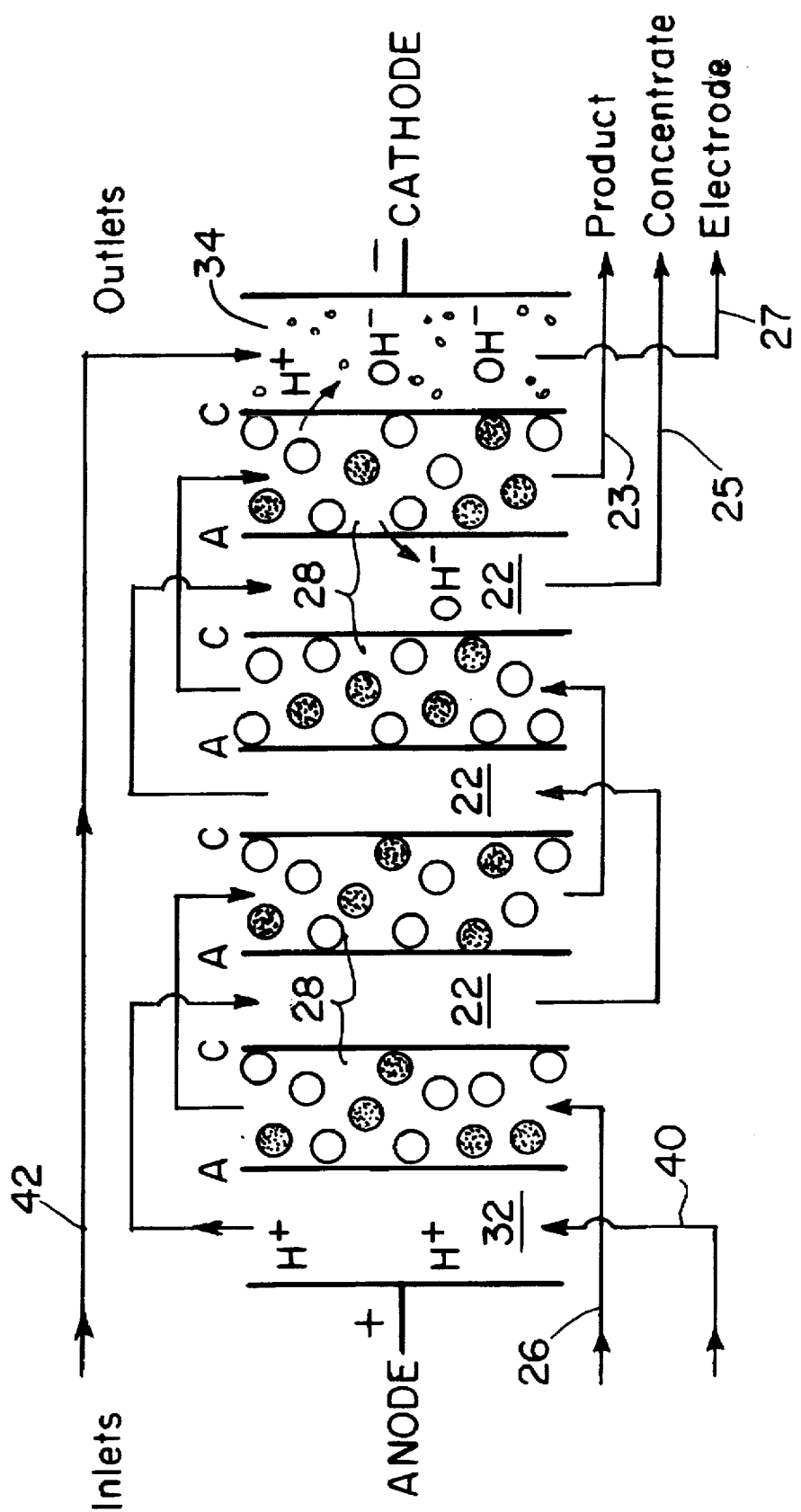
FIG. 3 is a schematic diagram of an alternative electrodeionization process utilizing the apparatus of this invention.

Referring to FIG. 3, a liquid flow path pattern is shown wherein concentrated electrolyte liquid 40 is passed in series through anode compartment 32 and ion concentrating compartments 22 while liquid to be purified 26 is passed in series through ion depleting compartments 28. The ion concentrating compartment may also contain a mixture of anion and cation resin. The ion depleting compartments 28 contain a mixture of anion and cation exchange resin beads. The ion concentrating compartments 22 and the ion depleting compartments 28 are bounded by anion permeable membranes, A, and cation permeable membranes, C. A third electrolyte liquid stream 42 is passed through cathode compartment 34 containing electrically conductive material. Purified product 23 is recovered while concentrate 25 and electrode liquid 27 are sent to waste or recycled to their respective inlets.

Figure 4:
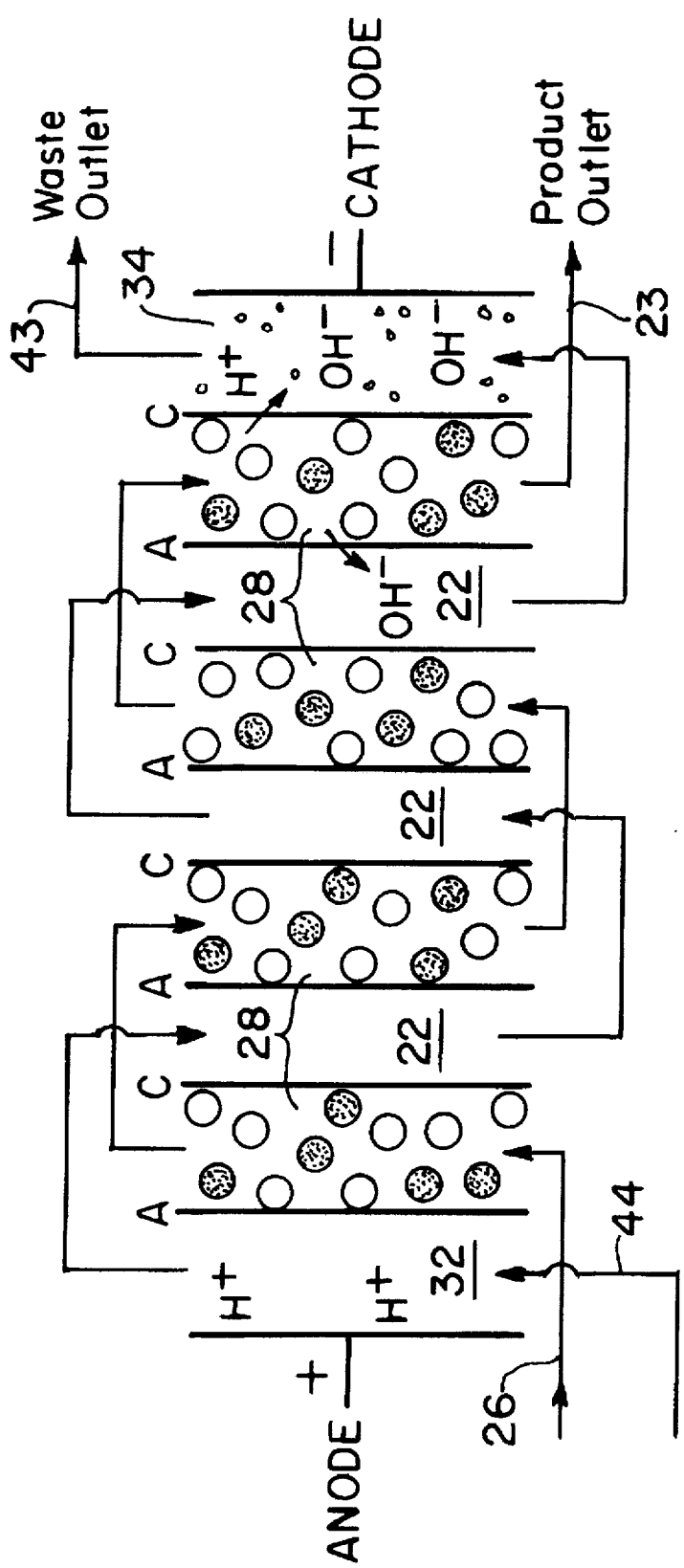
FIG. 4 is a schematic diagram of an alternative electrodeionization process utilizing the apparatus of this invention.
Figure 5:
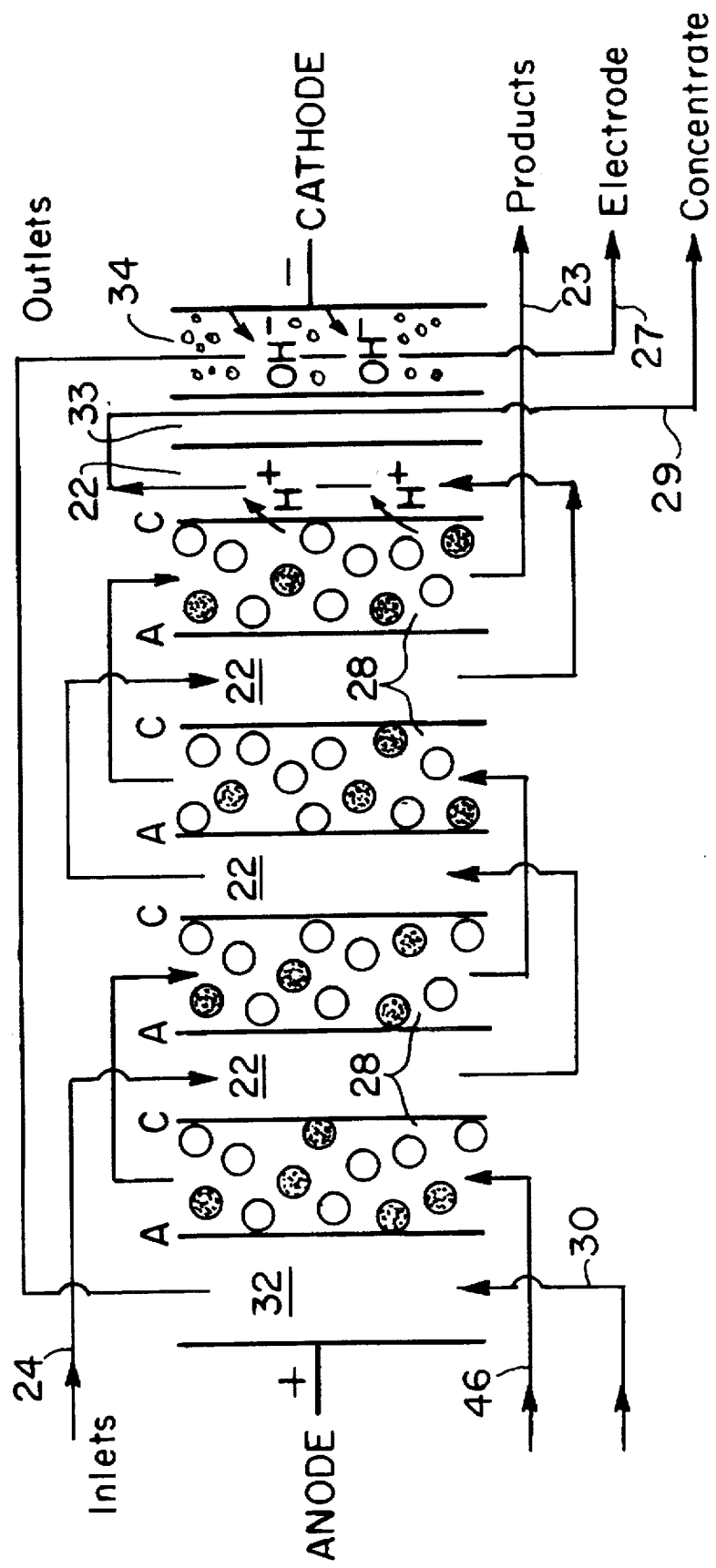
FIG. 5 is a schematic diagram of an alternative electrodeionization process utilizing the apparatus of this invention.

Referring to FIG. 4, a liquid flow path pattern is shown wherein concentrating electrolyte to liquid 44 is passed in series through anode compartment 32, ion concentrating compartments 22 and cathode compartment 34 containing electrically conductive material. Liquid to be purified 26 passes in series through ion depleting compartments 28. The ion depleting compartments 28 contain a mixture of anion and cation exchange resin beads. The ion concentrating compartment may also contain a mixture of anion and cation exchange resin. The concentrating compartment 22 and the ion depleting compartments 28 are bounded by anion permeable membranes, A, and cation permeable membranes C. Purified product 23 is recovered while concentrate and electrode liquid 43 is sent to waste or recycled to its inlet Referring to FIG. 5, a liquid flow path pattern is shown wherein concentrated electrolyte liquid 24 is passed in series through ion concentrating compartments 22 and neutral zone 33 while liquid to be purified 46 is passed in series through ion depleting compartments 28. The ion depleting compartments 28 contain a mixture of anion and cation exchange resin beads. The ion concentrating compartments may also contain a mixture of anion and cation exchange resin. The ion concentrating compartments 22 and the ion depleting compartments 28 are bounded by anion permeable membranes, A, and cation permeable membranes C. A third electrolyte liquid stream 30 is passed in series through the anode compartment 32 and cathode compartment 34 containing electrically conductive material. Purified product 23 is recovered while concentrate 29 and electrode liquid 27 are sent to waste or recycled to their respective inlets.

Figure 6:
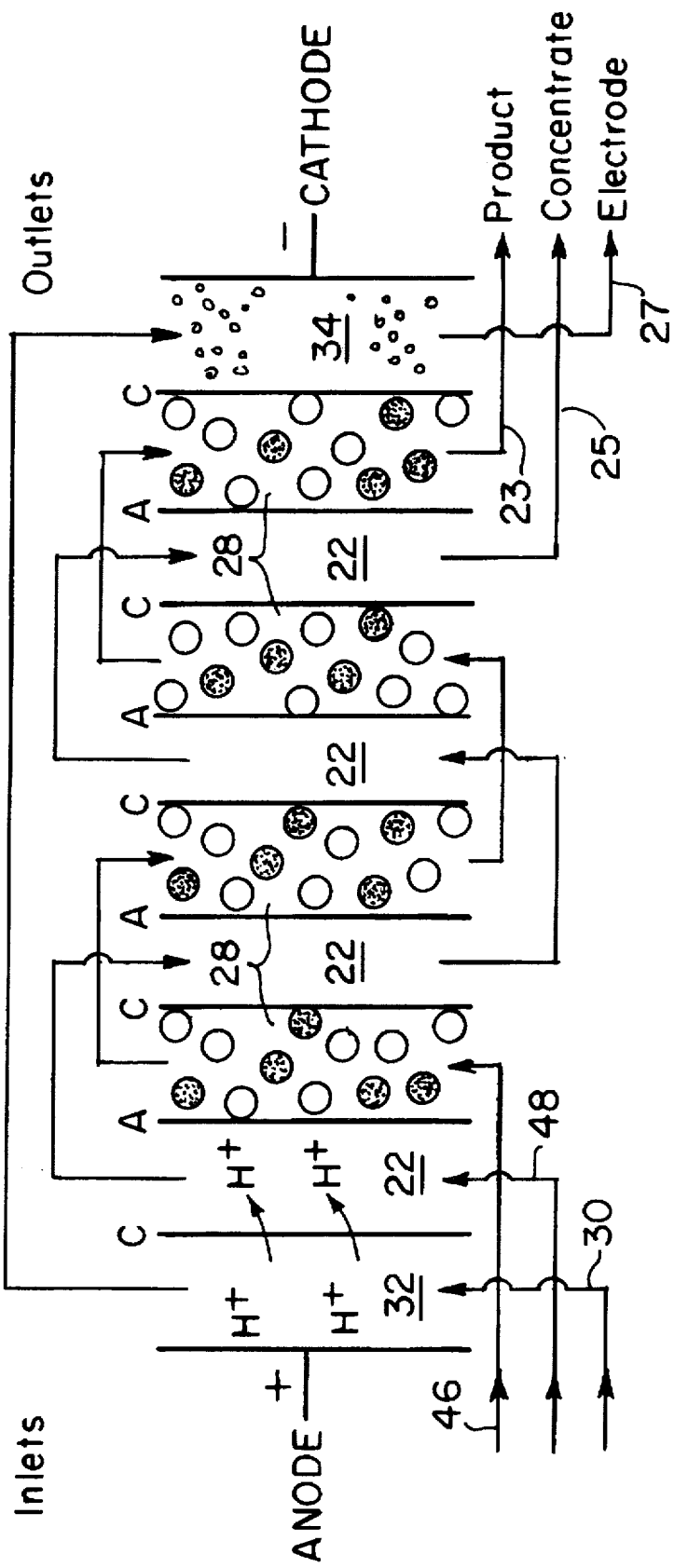
FIG. 6 is a schematic diagram of an alternative electrodeionization process utilizing the apparatus of this invention.

Referring to FIG. 6, a liquid flow path pattern is shown wherein concentrating electrolyte liquid 48 is passed in series through ion concentrating compartments 22 while liquid to be purified, 46, is passed in series through ion depleting compartments 28. The ion depleting compartments 28 contain a mixture of anion and cation exchange resin beads. The concentrating compartments may also contain a mixture of anion and cation exchange resin. The concentrating compartments 22 and the ion depleting compartments 28 are bounded by anion permeable membranes, A, and cation permeable membrane C. A third electrolyte liquid stream 30 is passed in series through anode compartments 32 and cathode compartment 34 containing electrically conductive materials. Purified product 23 is recovered while concentrate 25 and electrode liquid 27 are sent to waste or recycled to their respective inlets.

Figure 7:
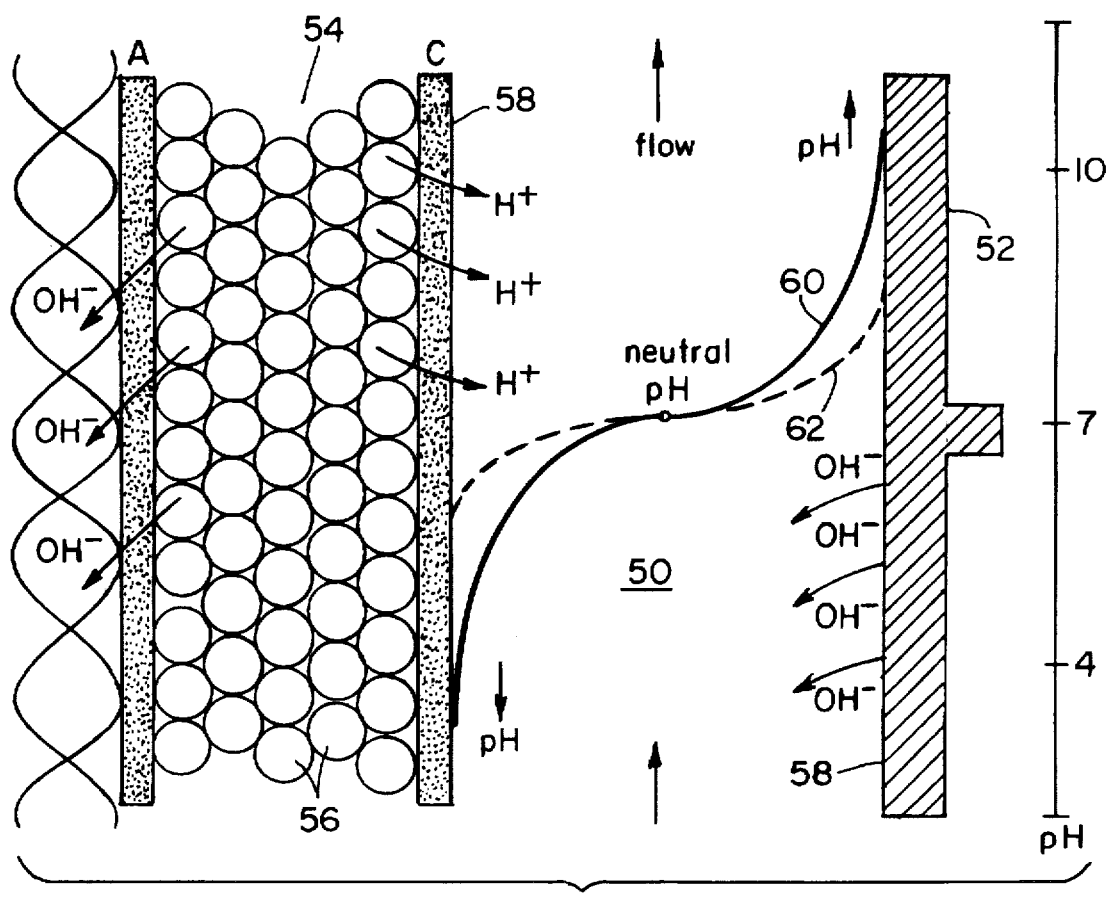
FIG. 7 illustrates the effect on pH in the cathode compartment as a result of this invention.

Referring to FIG. 7, the effect of the present invention on pH at the cathode is illustrated schematically. For purposes of clarity in FIG. 7, the conductive material present in the cathode compartment are not shown. In fact, the cathode compartment 50 includes electrically conductive materials in contact with cathode plate 52. The ion depleting compartment 54 contains ion exchange resin beads 56 and is bounded by anion permeable membrane, A, and cation permeable membrane, C. Hydronium ions pass through membrane C so as to reduce pH at the membrane surface 58 in cathode compartment 50. During the purification process hydroxide ion is produced at the cathode surface 58. When conductive material is not present all the hydroxide ion is produced at the cathode surface 58 resulting in high local pH illustrated by the solid line 60. With the presence of electrically conductive material, not shown, in the cathode compartment 50 the hydroxide ion is produced over the high surface area of the conductive material resulting in the lower local pH at the cathode surface 58 illustrated by the dotted line 62. The effect of the lower conductive material, not shown, in the cathode compartment 50 is to change the local surface pH from the values illustrated by the solid line 60 to the values illustrated by the dotted line 62.

Figure 8:
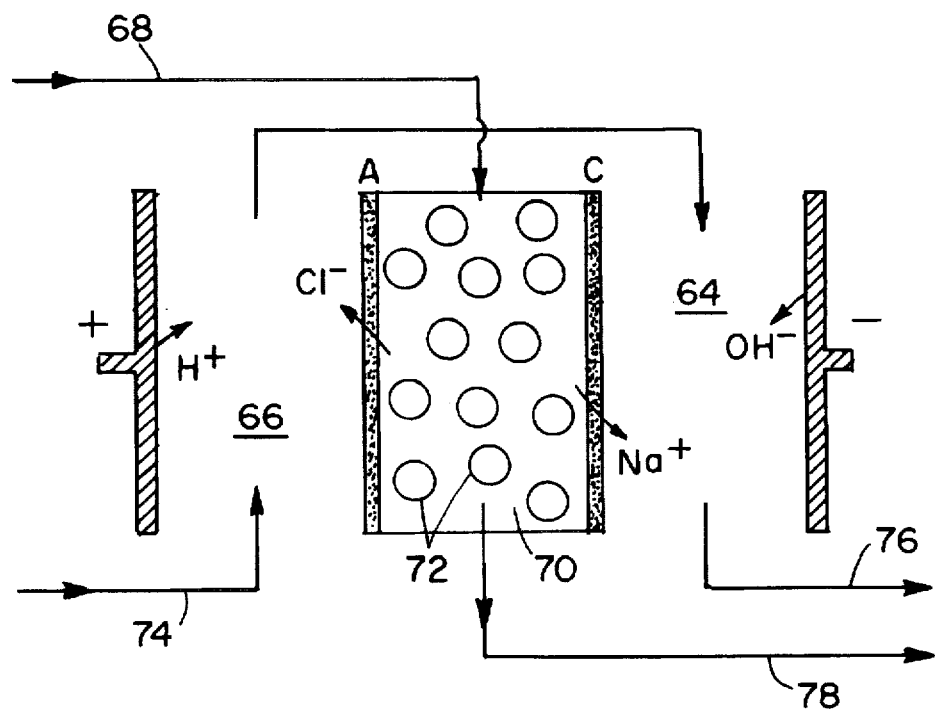
FIG. 8 is a schematic diagram of this invention wherein the concentrating compartments are only the anode compartment and the cathode compartment.

Referring to FIG. 8, the cathode compartment 64 and anode compartment 66 function as ion concentrating compartments. The aqueous liquid to be purified 68 passes through ion depleting compartment 70 including an anion permeable membrane A and a cation permeable membrane, C and including ion exchange resin beads 72. Aqueous liquid 74 for accepting ion species, e.g. $Cl^-$ and $Na^+$ is passes serially through anode compartment 66 and cathode compartment 64 containing electron conducting particles and is discarded as stream 76. Purified aqueous liquid 78 is recovered as product.

What is claimed:

1. In a process for purifying an impure aqueous liquid to remove ionic species in an electrodeionization apparatus by passing said impure aqueous liquid through at least one ion depleting compartment bounded by an anion permeable membrane and a cation permeable membrane and containing ion exchange resin beads and passing water for accepting said ionic species through at least one ion concentrating compartment bounded by an anion permeable membrane and a cation permeable membrane while producing an electrical potential between a cathode compartment and an anode compartment and passing electrical current through each of said at least one ion depleting compartment and through each of said at least one ion concentrating compartment, the improvement which comprises:

including in said cathode compartment particles capable of conducting electrons.

2. The process of claim 1 wherein said particles capable of conducting electrons comprise metal particles.

3. The process of claim 1 wherein said particles capable of conducting electrons comprise carbon particles.

4. The process of claim 1 wherein said particles capable of conducting electrons comprise a mixture of carbon particles and metal particles.

5. The process of any one of claims 1, 2, 3 or 4 wherein said electrodeionization apparatus includes a plurality of ion depleting compartment and a plurality of ion concentrating compartments.

6. In a process for purifying an impure aqueous liquid to remove ionic species in an electrodeionization apparatus by passing said impure aqueous liquid through an ion depleting compartment bounded by an anion permeable membrane and a cation permeable membrane and containing ion exchange resin beads and passing water for accepting said ionic species through an anode compartment including an anion permeable membrane and a cathode compartment including a cation permeable membrane while producing an electrical potential between said cathode compartment and said anode compartment and passing electrical current through said ion depleting compartment, the improvement which comprises:

including in said cathode compartment particles capable of conducting electrons.

7. The process of claim 6 wherein said particles capable of conducting electrons comprise metal particles.

8. The process of claim 6 wherein said particles capable of conducting electrons comprise carbon particles.

9. The process of claim 6 wherein said particles capable of conducting electrons comprise a mixture of carbon particles and metal particles.

10. The process of any one of claims 6, 7, 8 or 9 wherein said electrodeionization apparatus includes a plurality of ion depleting compartment and a plurality of ion concentrating compartments.

* * * * *